United States Patent
Kolyer et al.

[15] 3,683,048
[45] Aug. 8, 1972

[54] MONOFUNCTIONALLY-BLOCKED TRIS(2-HYDROXYALKYL)ISOCYANURATES AND POLYESTERS THEREOF

[72] Inventors: John M. Kolyer, Convent; Albert A. Kveglis, Pine Brook, both of N.J.

[73] Assignee: Allied Chemical Corporation, New York, N.Y.

[22] Filed: Nov. 13, 1970

[21] Appl. No.: 89,532

Related U.S. Application Data

[63] Continuation-in-part of Ser. No. 725,163, April 29, 1968, abandoned.

[52] U.S. Cl. ............... 260/868, 260/40 R, 260/75 N, 260/248 A
[51] Int. Cl. ..... C08f 21/00, C08f 21/02, C08g 17/10
[58] Field of Search ......................... 260/75 N, 868

[56] References Cited

UNITED STATES PATENTS

| | | | |
|---|---|---|---|
| 3,215,758 | 11/1965 | Hopkins | 260/868 |
| 3,235,553 | 2/1966 | Sadle | 260/248 |
| 3,331,839 | 7/1967 | Little | 260/248 |
| 3,407,200 | 10/1968 | Little et al. | 260/248 |
| 3,477,996 | 11/1969 | Formani | 260/75 |
| 3,448,084 | 6/1969 | Burdick et al. | 260/75 |

OTHER PUBLICATIONS

Goodman et al., Polyesters Vol. I, New York 1965 (pp. 16–19)
Boenig, Unsaturated Polyesters, Elsevier, New York 1964 (p. 139)

Primary Examiner—Melvin Goldstein
Attorney—Michael S. Jarosz

[57] ABSTRACT

Monofunctionally-blocked tris(2-hydroxyalkyl)isocyanurates, made by reaction with equimolar amount of a monocarboxylic acid, are statistically difunctional alcohols useful for making polyesters. Use of an $\alpha$-ethylenically unsaturated polycarboxylic acid or an $\alpha$-ethylenically unsaturated monocarboxylic acid blocking agent in conjunction with a cross-linking monomer gives casting resins which are heat resistant, self-extinguishing, weather resistant, and color stable.

15 Claims, No Drawings

3,683,048

MONOFUNCTIONALLY-BLOCKED TRIS(2-HYDROXYALKYL)ISOCYANURATES AND POLYESTERS THEREOF

RELATED APPLICATIONS

This application is a continuation-in-part of application Ser. No. 725,163, filed Apr. 29, 1968 now abandoned.

BACKGROUND OF THE INVENTION

This invention relates to novel resinous compositions. In particular it relates to blocked tris(2-hydroxyalkyl-isocyanurates and polyesters derived therefrom.

Tris(2-hydroxyethyl)isocyanurate and polyesters derived therefrom are known in the literature; for example, Little U.S. Pat. 3,088,948 discloses tris(2-hydroxyethyl)isocyanurate and its homologues, and Meyer U.S. Pat. 3,342,780 discloses polyesters derived from the isocyanurate and terephthalic and isophthalic acids. Also, Formaini application Ser. No. 443,655, filed Mar. 21, 1965, discloses the reaction of tris(2-hydroxyalkyl)isocyanurates with unsaturated acids such as maleic acid, to make polyesters. However, the prior art does not teach the beneficial effect obtained by first blocking one hydroxyl group of a tris(2-hydroxyalkyl)isocyanurate prior to polyesterification.

SUMMARY OF THE INVENTION

The novel materials of this invention are statistically difunctional alcohols, i.e., monofunctionally-blocked tris-(2-hydroxyalkyl)isocyanurates, wherein each 2-hydroxyalkyl group contains from 2 to 4 carbon atoms, and polyesters derived therefrom. Tris(2-hydroxyalkyl)isocyanurates are polyhydric alcohols of the formula:

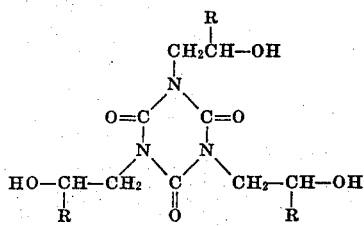

wherein R is hydrogen, methyl or ethyl. By the terms "monofunctionally-blocked" or simply "blocked isocyanurate" as used in this application, are meant those isocyanurates wherein one hydroxyl group has been esterified by reaction with about an equimolar amount of a monocarboxylic acid, thereby affording a statistically difunctional alcohol. The blocked isocyanurate products of the invention have the formula:

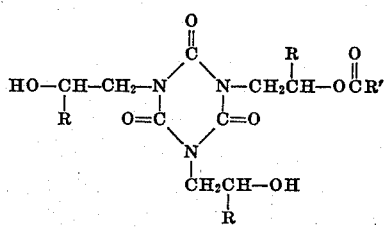

wherein R' is the residue of the blocking acid and R is as given above.

The blocked isocyanurates of this invention are useful in the preparation of unsaturated polyesters by reaction with a polycarboxylic acid reactant. In particular, use of an α-ethylenically unsaturated dicarboxylic acid or derivative thereof or of an α-ethylenically unsaturated monocarboxylic blocking acid affords polyesters which can undergo cross-linking to afford casting resins of improved heat resistance, weatherability, color stability, self-extinguishing properties and the like.

DETAILED DESCRIPTION OF THE INVENTION

Tris(2-hydroxyethyl)isocyanurate is the preferred isocyanurate for the purposes of this invention, and its use will be described in detail hereinafter. This material is readily prepared by methods taught in aforesaid U.S. Pat. No. 3,088,948.

The isocyanurate must be monofunctionally-blocked in the manner taught hereinafter, in order to obtain polyesters having the desired properties. If one of the isocyanurate hydroxyl groups is not blocked, the resulting polyester will not, for example, have the desired solubility or gelation properties. Blocked tris(2-hydroxyethyl)isocyanurate, wherein one hydroxyl group is esterified, is prepared by conventional esterification processes, whereby the isocyanurate is reacted with sufficient monocarboxylic acid to form a statistically difunctional alcohol viz. about an equimolar amount.

Suitable monocarboxylic blocking acids which can be used include alkanoic acids, preferably of 1–12 carbon atoms such as formic acid, acetic acid, propionic acid, butyric acid, pivalic acid, caproic acid, pelargonic acid and lauric acid. These acids can be unsubstituted or substituted with aryl, halogen or alkoxy groups, such as chloroacetic acid, β-bromopropionic acid, methoxyacetic acid, phenylacetic acid and the like. Aromatic acids are also suitable blocking acids, including benzoic acid, alkylbenzoic acids such as o—, m— and p-toluic acids, halobenzoic acids such as o—, m× and p-chlorobenzoic acids or o—, m— and p-bromobenzoic acids, nitrobenzoic acids, such as o—, m—, and p-nitrobenzoic acids and alkoxybenzoic acids such as anisic acid and the like. The blocking acid can also contain an α-ethylenic unsaturated group. Alkenoic acids containing up to about 12 carbon atoms, such as acrylic acid, methacrylic acid, crotonic acid and vinylacetic acid, either unsubstituted or substituted, can be used, particularly when it is desirable to use a saturated or aromatic dicarboxylic acid in the preparation of polyesters.

About an equimolar amount of the monocarboxylic blocking acid will normally be used i.e., between about 0.9 and 1.2 mols of monocarboxylic acid per mol of isocyanurate.

The reaction is preferably conducted under an inert atmosphere, for example nitrogen, and either with or without a solvent. Solvents which can be used include the common inert solvents such as benzene, toluene, or xylene. The esterification is conducted at elevated temperatures for example in the range of about 160° to 230° C.; preferably the reaction will be conducted between 200° C. and 220° C.

No catalyst is necessary, although the usual esterification catalysts, such as p-toluenesulfonic acid, can be employed.

The acid number of the reaction product provides a convenient measure to determine whether the esterification has proceeded far enough to provide a monofunctionally-blocked isocyanurate. When this number, which is the number of milligrams of potassium hydroxide required to neutralize one gram of the sample, has a value between about 10 and 30, the desired product has been obtained. When the acid number is greater than 30, insufficient blocking has occurred and when it is less than about 5, excessive blocking has occurred. Preferably the blocked isocyanurate will have an acid number of about 25-27. The acid number may be determined by standard procedures well known to those skilled in the art.

The blocked isocyanurate can be isolated if desired by standard recovery procedures such as solvent removal, extraction, crystallization, and the like. Also it can be purified by recrystallization, trituration, etc. After isolation, the blocked isocyanurate can be subjected to polyesterification to afford the desired polyesters.

The polyesters can also be obtained without isolation of the blocked isocyanurate, by adding a dicarboxylic acid and other polyesterification ingredients directly to the reaction mixture containing the blocked isocyanurate. This can be conveniently accomplished by lowering the temperature of the reaction mixture to about 150° C., adding the additional reactants and then raising the temperature t facilitate polyesterification.

Dicarboxylic acids which can be used in the preparation of the instant unsaturated polyesters include free dicarboxylic acids, or derivatives thereof including their anhydrides, acyl halides, e.g. diacid chlorides, or lower dialkyl esters. Mixtures of functional dibasic acids can also be employed. α-Ethylenically unsaturated dicarboxylic acid reactants which can be used include maleic acid, maleic anhydride, fumaric acid, citraconic acid, mesoconic acid, tetrahydrophthalic acid, itaconic anhydride, endo-bis-5-norbornene-2,3-dicarboxylic acid; and isomers of methyl bicyclo (2·2·1)heptene-2, 3-dicarboxylic acid. Maleic anhydride is the preferred unsaturated acid reactant. Dicarboxylic acids which do not contain an α-ethylenic double bond can be used when the monocarboxylic acid blocking agent contains an α-ethylenic double bond. Mixtures of an α-ethylenically unsaturated polycarboxylic acid with an aromatic or saturated dicarboxylic acid can also be employed. Polyesters derived from such mixtures are particularly useful when the benefits derived from each type are desired; for example, high rigidity and thermal stability are obtained by using a mixture of maleic anhydride and a phthalic acid. Suitable aromatic and saturated dicarboxylic acid reactants include phthalic, isophthalic and terephthalic acids; succinic acid, adipic acid, sebacic acid, azelaic acid, dodecanedioic acids and the like. Of course, mixtures of dibasic acids can also be used, rather than a single acid; mixtures of aromatic or saturated and α-ethylenically unsaturated acids are particularly useful when the benefits derived from each type are desired; for example, high rigidity and thermal stability are obtained by using a mixture of maleic and phthalic acids or anhydrides.

In making the unsaturated polyesters, at least about 95 equivalent percent of hydroxyl material should be employed based on the amount of acid used, and preferably an excess of between 100 and 120 equivalent percent of hydroxyl material will be used. The amount of hydroxyl material employed is specified herein in terms of equivalents since the alcohol and acid react on an equivalent basis rather than on a molar basis.

After addition of the dicarboxylic acid reactant, heating of the reaction mixture is continued at an elevated temperature between about 150° C. and 250° C. and preferably between about 200° and 225° C., until the desired acid number is obtained. Usually preferred products will have an acid number less than about 60, although higher acid numbers may be desireable depending upon molecular weight and end use criteria. To obtain polyesters especially useful for casting, an acid number between about 10 and 25 is desirable, preferably between about 18 and 21.

While the blocked isocyanurate can be employed as the sole polyhydric alcohol reactant in the instant polyesters, it can also be replaced in part by one or more other polyhydric alcohols. As little as about 5 percent by weight of the total polyhydric alcohol can be blocked isocyanurate, but preferably at least about 20 percent by weight will be blocked isocyanurate. On an equivalent basis, preferably at least about 5 percent of the total polyhydric alcohol content will be a blocked isocyanurate.

Modifying polyhydric alcohols which can be employed in this fashion include ethylene glycol, propylene glycol, glycerin, pentaerythritol, 1,1,1-trimethylolethane, 1,1,1-trimethylolpropane, sorbitol, mannitol, dipentaerythritol, α,ω-aliphatic hydrocarbon diols having 4 to 5 carbon atoms, e.g., butanediol-1,4, pentanediol-1,5, butene-2-diol-1,4, and butyne-2-diol-1,4, and cyclic glycols, e.g., 2,2,4,4-tetramethyl-1, 3-cyclobutanediol, hydroquinone di-beta-hydroxyethyl ether and 1,4-cyclohexanedimethanol.

When a modifying polyhydric alcohol is used, it can be added to the polyesterification reaction mixture along with the other components according to procedures well known to those skilled in the art. Excellent results are also obtained when the dicarboxylic acid is partially esterified with the blocked isocyanurate prior to further esterification with a modifying glycol.

The glycols which may be advantageously used in this latter two-step process may vary widely. In general, they are the glycols conventionally used in preparing polyesters, including alkylene glycols of the formula HOROH wherein R is alkylene, generally of 2 to 10 carbon atoms, e.g., ethylene, propylene, butylene, etc. Ether alcohols are also suitable such as diethylene glycol, and dipropylene glycol. Other suitable alcohols are well known, such as tripropylene glycol, triethylene glycol, tetramethylene glycol, neopentyl glycol, 2-methyl-1,3-pentanediol, 1,5-pentanediol, hexamethylene glycol, etc. Preferably an alkylenediol will be used.

Inasmuch as an α-ethylenically unsaturated dicarboxylic acid or monocarboxylic blocking group is employed in the polyesterification reaction, it is desirable to add a vinyl polymerization inhibitor into the reaction mixture, for example hydroquinone, mono-t-butyl-hydroquinone, benzoquinone and the like. Between about 0.02 percent and 0.05 percent by weight of the inhibitor should be added.

The polyester can be isolated from the reaction mixture by a variety of procedures well known to those skilled in the art, for example by removal of solvent, by cooling to afford solidification, etc.

In addition to the two-step procedure described hereinabove, wherein the blocked isocyanurate is first prepared and then polyesterified, it is also possible to use a single-step process. For this purpose the polycarboxylic acid reactant is added to the isocyanurate along with the monocarboxylic blocking agent. Depending upon the relative activities of the blocking agent and the polycarboxylic acid reactant, reaction conditions such as the reaction temperature, catalysts, order of addition of the reactants and the like can be adjusted to insure that one hydroxyl group of the tris(2-hydroxyalkyl)-isocyanurate precursor is blocked by the monocarboxylic acid. In particular, provision must be made for return of volatilized monocarboxylic acid to the reaction vessel.

Use of an α-unsaturated dicarboxylic acid in preparing polyesters from blocked isocyanurates, or use of an isocyanurate blocked with an alkenoic carboxylic acid, affords compositions suitable for laminates, casting resins, etc. For this purpose an appropriate cross-linking monomer is added to the composition, e.g., styrene, α-methylstyrene, methyl methacrylate, diallyl phthalate, triallylisocyanurate, triallylcyanurate, ethylene glycol dimethacrylate and homologs thereof, diethylene glycol divinyl ether, alkyl vinyl ethers, alkyl acrylates, etc.

The choice of cross-linking monomer will depend in part upon the desired characteristics and properties of both the polyester and final product to be fabricated therefrom. For example, if it is desirable to use a high level of isocyanurate or unsaturated acid, etc. in preparing polyester, in order to impart certain physical or chemical properties to the product, the most advantageous monomer can vary from styrene to a styrene-methyl methacrylate mixture to diallyl phthalate. The selection of cross-linking agent will be influenced in these instances by considerations such as solubility, shelf life of the compound, and properties desired in the cured product, such as flame resistance, weatherability, and heat resistance.

The amount of cross-linking monomer employed will vary according to the end use of the product, but generally cross-linking monomer concentrations between about 5 percent and 70 percent by weight of the total mixture will give products useful for casting and laminates. Preferably, the cross-linking monomer concentration will be between 30 percent and 60 percent by weight of the total mixture.

In addition to the cross-linking monomer, unsaturated polyesters will also contain a suitable vinyl polymerization initiator or catalyst for the cross-linking, and optionally a promoter. Initiators are well known and include peroxides such as benzoyl peroxide, di-t-butyl peroxide, dicumene peroxide, methylethyl ketone peroxide and the like; hydroperoxides such as t-butylhydroperoxide; azo compounds such as azo-bis-isobutyronitrile, azo-bis-valeronitrile and the like. Catalytic amounts of the initiator, e.g., 0.2–2 percent by weight are used. Useful promoters are also conventional and include naphthenates and alkanoates of metals such as cobalt, lead, manganese, and calcium.

The instant unsaturated polyesters are useful in the preparation of laminates and castings with superior qualities. Depending upon the particular application, the selection of specific ingredients and proportions will vary. It is always necessary that monofunctionally-blocked isocyanurate be used to obtain resins suitable for casting and molding. The selection of the blocking acid will affect the hardness as well as room temperature strength and elevated temperature strength retention at a given level of unsaturation. Of the monocarboxylic acids which can be used to block one hydroxyl group of a tris(2-hydroxyalkyl)isocyanurate, benzoic acid usually affords the best result in terms of rigidity and strength retention and is preferred. Use of an aliphatic blocking acid will impart greater flexibility to the polyester.

It has been found that the use of a glycol in the manner disclosed hereinbefore, such as propylene glycol, improves the properties of the unsaturated polyesters of blocked isocyanurate. The addition of the glycol affords a more rigid polyester which has better strength retention at elevated temperatures. For this purpose between about 10 percent and 16 percent by weight of a glycol, preferably 11–13 percent by weight, is advantageously added to the polyesterification reaction mixture.

Among the improved properties which the instant unsaturated polyesters have its greater thermal stability and heat resistance. The heat stability of these polyesters, indicated by weight loss of sample in a forced-draft air oven, improves with increasing content of blocked isocyanurate in the polyester composition. For example, a polyester containing one mol of blocked tris(2-hydroxyethyl)isocyanurate, 1.1 mol of propylene glycol and 1.0 mol of maleic anhydride lost about 1 percent of its weight at 80° C. after 50 hours. To obtain heat resistant polyesters it is preferable to use an effective amount of at least about 0.9 mols of blocked isocyanurate per mol of dicarboxylic acid and more preferably about 1.1 mols. Also, the amount of modifying alcohol, such as propylene glycol or ethylene glycol, is preferably 0.9 to 1.2 mols per mol of dicarboxylic acid. Additional factors affecting the heat resistance of the unsaturated blocked isocyanurate polyesters include the α-ethylenically unsaturated polycarboxylic acid content, the nature of the monocarboxylic acid, and the nature of the cross-linking monomer.

As the level of α-ethylenic unsaturation increases, the heat stability of the polyester increases. Also, as mentioned hereinabove, diallyl phthalate is a preferred cross-linking monomer to improve heat stability, and triallylisocyanurate is particularly preferred. Furthermore, use of an aromatic monocarboxylic acid as a blocking agent affords better heat stability than does use of an aliphatic monocarboxylic blocking acid.

The excellent heat resistance of these unsaturated polyesters renders them especially suitable for cross-linked castings and laminates for such end uses as electrical applications at elevated temperature, e.g. switchgear.

With an increasing level of α-ethylenic unsaturation in the present unsaturated polyesters, the flammability of the product is reduced to a point where castings are self-extinguishing. For this purpose it is preferable to have a level of α-ethylenically unsaturated acid, such as maleic or fumaric, of at least about 14 percent by weight based on the charge to the polyesterification reaction medium, and more preferably about 20 percent by weight. For example, a polyester having 14 percent by weight of maleic acid and 6.5 percent nitrogen content burns for only 0.15 inches at a rate of only 0.089 inches per minute as measured by the procedure of ASTM D–635–63 and so is classified "self-extinguishing." This self-extinguishing property renders the instant polyesters useful in applications such as building construction, military, marine, and automotive uses.

Improved weatherability is an additional feature of the unsaturated blocked isocyanurate polyesters of the invention. Castings and laminates made from these unsaturated polyesters withstand adverse weather conditions for better than those made from materials heretofore considered to have excellent weatherability. Thus, laminates made from the instant polyesters exhibited very little fiber bloom or loss of original gloss long after other products presently available had deteriorated under conditions of high energy ultraviolet radiation, high humidity, elevated temperature, and intermittant water spray. Furthermore, laminates made from the instant polyesters exhibited excellent color stability upon aging.

Methyl methacrylate is a preferred cross-linking monomer for this purpose since it brings the refractive index of the resin closer to that of glass. When used in a 50:50 mixture of styrene, this cross-linking agent imparts improved weatherability to the polyesters. The amount of cross-linking monomer to be blended with the polyester to impart improved weather-resistance is between about 30 percent and 50 percent by weight, preferably between 35 percent and 45 percent by weight.

The isocyanurate content as well as type and level of unsaturation also affects the weatherability of products made from the instant polyesters. Specifically, based on polyester charge weight, blocked isocyanurate content should be between about 87 percent and 64 percent and unsaturation (e.g. maleic or fumaric acids, or anhydride) content should be between about 13 percent and 36 percent. Preferably, between about 10 percent and 16 percent by weight of a glycol, such as propylene glycol, will be added, thereby lowering the upper limit of isocyanurate to between about 77 percent and 71 percent by weight.

Other features which improve weather resistance include added ultraviolet absorbers, e.g., benzophenones and benzotriazoles, and high resin content in laminates.

Because of their ability to maintain high surface gloss, the present polyesters can be used advantageously in articles such as high voltage insulators. Gloss retention is important to limit flashover or leakage, which is objectionable above a certain minimal level and which may erode the surface and change the shape of the insulator, thereby permitting even greater flashover. Furthermore, a weathered or rough surface would capture pollutants from the air, thus increasing conductivity and aggravating flashover. For these reasons, the improved weather resistance of the unsaturated blocked isocyanurate polyesters makes them well suited for this application.

The instant unsaturated polyesters may be blended into typical anti-tracking type alkyd molding formulations for use as high voltage insulators and other articles where anti-tracking properties are important. These formulations typically contain a polyester, cross-linking monomer, catalyst or initiator, stabilizer, hydrated aluminas, and the like, in accordance with techniques well known to those skilled in the art.

Also, these polyesters can be blended into high-impact type alkyd molding compounds of the variety familiar to those skilled in the art. All these alkyd molding compounds may contain pigments and fillers where desirable. When the formulations of the instant unsaturated polyesters are to be fabricated into final products, they can be cured, pressure molded, transfer molded, and injection molded by standard procedures. For example, the polyester can be cut with a cross-linking monomer and cured with 1% benzoyl peroxide (in a 50 percent tricresyl phosphate paste) for 18 hours at 50° C., followed by 2.5 hours at 120°–125° C.

The following examples are provided to more fully illustrate the instant invention. They are provided for illustrative purposes only and are not to be construed in any way as limiting the scope of invention which is defined by the appended claims. In the examples, percent is by weight.

EXAMPLE I

Monofunctionally-blocked Tris(2-hydroxyethyl)isocyanurate

Tris(2-hydroxyethyl)isocyanurate (1620.4 g., 6.21 mols) and benzoic acid (833.1 g., 6.83 mols) were charged into a 5 liter, baffled resin kettle equipped with a twin-bladed stainless steel turbine agitator, thermometer, adjustable-length nitrogen inlet tube, and steam-jacketed Allihn rectification condenser with Friedrichs condenser set for downward distillation. The mixture was brought to 220° C. from room temperature in 3 hours, and held at 220° C. with a Brookstat proportionating temperature controller, under a nitrogen sparge of 2.0 standard cubic feet of air per hour (SCFH) and 350 RPM agitator speed. After 1 hour 38 minutes the acid number (AN) was 25.8. The reaction mixture was then cooled to room temperature to afford statistically difunctional benzoate-blocked tris(2-hydroxyethyl)-isocyanurate.

The procedure was repeated wherein the benzoic acid was replaced by an equivalent amount of the following acids: pivalic, caproic and pelargonic acid.

EXAMPLE II

Polyester of Benzoate-Blocked Tris(2-hydroxyethyl)-Isocyanurate and Maleic Acid

Benzoate-blocked tris(2-hydroxyethyl)isocyanurate was prepared by reacting 1.1 mols of tris(2-hydroxyethyl)isocyanurate with 1.2 mols of benzoic acid according to the procedure of Example I. Upon reaching an acid number of 26.0, the reaction was cooled to 150° C., and 1.0 mol of maleic acid was charged into the kettle along with hydroquinone (0.02 percent by weight based on total reactants charged).

The mixture was brought to 210° C. over one hour and held at 210° C. with a Brookstat proportionating temperature controller under a nitrogen sparge of 1.0 SCFH and 350 RPM agitator speed. AFter one hour at 210° C. the acid number had fallen below 50, and the steam-jacketed rectification condenser was removed for total take-off of volatiles. At this point an additional 0.015 percent by weight hydroquinone was added, and the reaction was continued at 210° C. for an additional 3 hours until the desired polyester properties were attained. The polyester had an acid number of 16.0 and a hydroxyl number (milligrams of potassium hydroxide per gram of sample) of 39.2.

EXAMPLE III

Heat Resistant Casting Resin

Benzoate-blocked tris(2-hydroxyethyl)isocyanurate of AN 26.1 was prepared according to the procedure of Example I, by reacting 1931.5 grams of tris(2-hydroxyethyl)isocyanurate (7.40 mols) and 994.5 grams of benzoic acid (8.15 mols). When the desired acid number was obtained, the reaction temperature was lowered to 150° C., and maleic anhydride (1452.0 g., 14.80 mols), propylene glycol (620.0 g., 8.15 mols), and hydroquinone (1.00 g., 0.02 weight % on charge weight) were added. The temperature was raised from 150° C. to 210° C. over 1½ hours and held there, using a Brookstat proportionating temperature controller. Agitator speed was maintained at around 350 RPM and $N_2$ sparge rate at 1.5–2.0 SCFH during the time. When the acid number had fallen below 50 the overhead was set for total take-off of volatiles, and 0.75 g. (.015 wt. percent on charge) hydroquinone added. After 5¼ hours at 210° C. the product was cooled to 160° C. and dumped into tared aluminum foil trays. The properties of the polyester were:

| | |
|---|---|
| Yield, % of theory | 99.0 |
| Acid Number (AN) | 19.2 (mg. KOH/g. sample) |
| Hydroxyl Number (HN) | 52.5 (mg. KOH/g. sample) |
| Number Average Mol. Wt., $M_{ne}$ | 1565 |
| Gardner-Holt Bubble Viscosity | $D^{3/4}$ (50% solids in methyl cellosolve) |

A portion of the solids was dissolved in diallyl phthalate (DAP) by stirring at 25°–68.5° C. to give 52.7 percent diallyl phthalate content (2.8:1 allyl group: maleic equivalence ratio). This solution (thinned viscosity $Z^{1-1/4}$) was mixed with 1 percent (on resin solution weight) benzoyl peroxide, as a 50 percent paste in tricresyl phosphate, and poured between polyvinyl alcohol film-covered vertical steel and glass plates separated by a 1⅛ inch thick Teflon spacer. The mold was heated for 18 hours at 50° C. and 2½ hours at 120°–125° C. in a forced-draft air oven to cure the resin.

The castings thus obtained were tested for thermal stability by measuring the weight loss as a function of time in a forced-draft air oven at 80° C. and at 240° C. The following Table illustrates heat resistance of the castings.

| 80°C. | Time (Hours) | 1 | 4 | 7 | 31 | 54 |
|---|---|---|---|---|---|---|
| | % Wt. Loss | 0.68 | 0.79 | 0.97 | 1.02 | 1.13 |
| 240°C. | Time (Hours) | 1 | 3 | 19 | 27 | 91 |
| | % Wt. Loss | 7.3 | 12.0 | 32.5 | 37.4 | 50.7 |

EXAMPLE IV

Self-Extinguishing Casting Resin

The procedure of Example III was repeated wherein 287.1 grams of tris(2-hydroxyethyl)isocyanurate (1.10 mols) and 127.6 grams of caproic acid (1.10 mols) were reacted to afford a statistically difunctional tris(2-hydroxyethyl)isocyanurate. When the acid number of the blocked tris (2-hydroxyethyl)-isocyanurate was 21.6, the reaction temperature was dropped to 153° C. and the following materials were added: phthalic anhydride (37.0 grams, 0.25 mol), maleic anhydride (73.5 grams, 0.75 mol) and hydroquinone (0.1845 grams, 0.035 percent by weight of charge). The resulting polyester had the following properties:

| | |
|---|---|
| Yield, % of theory | 92.0 |
| Acid Number (AN) | 18.9 (mg. KOH/g. sample) |
| Hydroxyl Number (HN) | 46.7 (mg. KOH/g. sample) |
| Number Average Mol. Wt., $M_{ne}$ | 1710 |
| Gardner-Holt Bubble Viscosity | D-E (50% solids in methyl cellosolve) |

Styrene was added to give a resin solution containing 31 percent styrene (2.8:1 styrene:maleic mol ratio), which was then mixed with benzoyl peroxide and cured according to the procedure of Example III.

A section of the clear casting thus obtained was subjected to the procedure of ASTM D–635–63 and the following data were observed: Burning Rate, 0.089 inches per minute; Distance Burned, 0.150 inches. The casting was self-extinguishing.

EXAMPLE V

Weather Resistant Alkyd Molding Compounds

A. Preparation of Polyester

Benzoic acid-blocked tris(2-hydroxyethyl)isocynaurate of acid number 25.8 was prepared as in Example I. The reaction mixture was then polyesterified with maleic anhydride (608.4 grams, 6.20 mols), phthalic anhydride (918.8 grams, 6.21 mols), and propylene glycol (519.2 grams, 6.82 mols), according to the procedure of Example III. The resulting polyester had the following properties:

| | |
|---|---|
| Yield, % of theory | 97.9 |
| Acid Number (AN) | 20.2 (mg. KOH/g. sample) |
| Hydroxyl Number (HN) | 20.2 (mg. KOH/g. sample) |
| Number Average Mol. Wt., $M_{ne}$ | 2780 |
| Gardner-Holt Bubble Viscosity | $F^{3/4}$ (50% solids in methyl cellosolve) |

B. High-Impact Type Alkyd Molding Compound

The following formulation was used to prepare a high-impact type alkyd molding compound:

| Material | Weight, g. | Weight, % |
|---|---|---|
| Polyester from A | 578 | 28.92 |
| Diallyl Phthalate (DAP) Monomer | 67 | 3.37 |
| 50% Benzoyl peroxide in Tricresyl Phosphate | 28 | 1.40 |
| Lignicol B Stabilizer | 0.8 | 0.04 |
| ASP-100 Filler | 578 | 28.54 |
| $BaCO_3$ | 98 | 4.91 |
| Stearic Acid | 19 | 0.94 |
| 622 ½" Glass | 618 | 30.88 |
| Mapico Black Pigment | 20 | 1.0 |
| Total | 2006.8 g. | |

The polyester was dissolved, with agitation, in methylene chloride in a 1 gallon can. Catalyst, stabilizer, monomer, and pigment were then added. After addition of the filler and barium carbonate, a solution of stearic acid in methylene chloride was added, and the slurry was rapidly stirred for about 15 minutes to obtain a uniform dispersion. The slurry was then poured onto the glass in a Hobart mixer, and the mixture was stirred to uniformly coat the glass with the slurry. The compound was spread out on large boards and dried overnight to remove the solvent. A charge of 460 g. was used to mold a 10 × 10 × ⅛ inch panel under a pressure of 75 tons on a 10¼ inch ram for 5 minutes at 300° F.

This panel was exposed in a "sunshine" carbon arc Atlas Weather-O-Meter to a cycle of 17 minutes spray and 143 minutes dry at 130° F., and after approximately 2100 hours exposure it showed very slight fiber bloom. A similar compound, wherein triallyl isocyanurate was substituted for DAP monomer, on an unsaturated equivalence basis, exhibited no fiber bloom under these same conditions.

A similar compound based on a benzoic acid-blocked tris(2-hydroxyethyl)isocyanurate polyester which had isophthalic acid substituted for phthalic anhydride and neopentyl glycol substituted for propylene glycol, both on a molar basis, showed no fiber bloom after about 21000 hours exposure when both DAP and 1,3-butylenedimethacrylate were employed as monomers on an unsaturated equivalence basis.

C. Anti-Tacking-Type Alkyd Molding Compound

The compound was spread out on a table and allowed to dry for several days.

A charge of 460 g. of the compound was compression molded to form a 10 × 10 × ⅛ inch panel under the same molding conditions used in Part B.

A similar compound was processed and molded the same way, with a polyester of the following relative molar composition: tris(2-hydroxyethyl)isocyanurate (1.0), benzoic acid (1.1), maleic acid (1.0), isophthalic acid (1.0), and neopentyl glycol (1.1).

Both of these compounds exhibited no wet arc tracking after more than 3000 minutes (test ended without tracking) according to the wet arc track resistance test (ASTM D–2303).

EXAMPLES VI – XIV

The procedure of Example III was repeated to prepare polyesters of the following composition, which were then mixed with the indicated cross-linking monomer to afford casting resins.

| Example | Composition of polyester (mols) | Acid No. | Hydroxyl No. | Mol. wt., $M_{no}$ | Monomer* | Monomer content, percent | Monomer:MA equivalence ratio |
|---|---|---|---|---|---|---|---|
| VI | T (1.0); BA (1.1); MA (1.0); PA (1.0); PG (1.1) | 23.2 | 23.2 | 2,420 | STY | 30.0 | 2.8:1 |
| VII | T (1.0); BA (1.1); MA (1.0); PA (1.0); PG (1.1) | 26.9 | 26.9 | 2,090 | DAP | 33.6 | 2.8:1 |
| VIII | T (1.0); BA (1.1); MA (1.0); AA (1.0); DEG (1.1) | 19.0 | 32.8 | 2,170 | STY | 30.0 | 2.8:1 |
| IX | T (1.0); BA (1.1); MA (2.0); PG (1.1) | 19.2 | 52.5 | 1,565 | STY/MMA | 20.0/20.0 | 2.0:1 |
| X | T (1.0); BA (1.1); MA (2.0); NPG (1.1) | 20.0 | 44.0 | 1,750 | STY/MMA | 25.0/25.0 | 3.2:1 |
| XI | T (2.2); NA (2.2); MA (1.0); PA (1.0) | 24.2 | 24.2 | 2,320 | DAP | 26.2 | 3.1:1 |
| XII | T (3.3); NA (3.3); MA (2.0); PA (1.0) | 20.4 | 44.5 | 1,730 | STY | 26.6 | 2.8:1 |
| XIII | T (1.1); NA (1.1); MA (1.0) | 24.6 | 50.3 | 1,500 | DAP | 39.8 | 2.8:1 |
| XIV | T (1.1); NA (1.1); MA (1.0) | 24.6 | 50.3 | 1,500 | STY | 35.8 | 2.8:1 |

\* Plus 1% benzoyl peroxide (as 50% paste in tricresyl phosphate).

NOTE.—T=Tris(2-hydroxyethyl) isocyanurate; BA=Benzoic acid; NA=Nonanoic acid; DEG=Diethylene glycol; MA=Maleic anhydride; PA=Phthalic anhydride; AA=Adipic acid; NPG=Neopentyl glycol; STY=Styrene; MMA=Methyl methacrylate; DAP=Diallyl phthalate; PG=Propylene glycol.

The following formulation was used to prepare an anti-tracking-type alkyl molding compound:

| Material | Weight, g. | Weight, % |
|---|---|---|
| Polyester from A | 431.8 | 17.27 |
| DAP Monomer | 84.3 | 3.37 |
| Ionol Stabilizer | 0.85 | 0.03 |
| Para-benzoquinone | 0.25 | 0.01 |
| 50% Benzoyl Peroxide In Plasticizer | 19.5 | 0.78 |
| Zinc Stearate | 20.5 | 0.82 |
| 847 Glass, ¼" | 412.5 | 16.5 |
| Hydrated Alumina C-331 | 1065.0 | 42.6 |
| Hydrated Alumina 710 | 355.3 | 14.21 |
| BaCO₃ | 110.3 | 4.41 |
| Total: | 2500.2 | |

Zinc stearate, the hydrated aluminas, and barium carbonate were charged into a 3 kg. capacity sigma-blade mixer and blended for about 3 minutes. Polyester, catalyst, stabilizers, monomer, and sufficient methylene chloride were mixed together to form a viscous solution which was added to the drys in the sigma mixer. The mass was mixed until a putty was formed (15–20 minutes). After a uniform putty was obtained, the mixing was continued for an additional 5 minutes. More methylene chloride was added during this stage to replace losses due to evaporation. The solvent was found necessary to maintain tractability during blending due to the solid nature of the polyester. The glass was added last and mixing was continued for about 10–15 minutes until all the glass was blended in.

EXAMPLE XV

A methacrylate-blocked tris(2-hydroxyethyl)-isocyanurate of acid number 25.5 was prepared by charging tris(2-hydroxyethyl)isocyanurate (130.5 g., 0.50 mol), methacrylic acid (43.3 g., 0.502 mol), toluene (235.0 g.), p-toluenesulfonic acid (6.3 g., 2.33 percent on total charge weight) and cupric acetate (0.45 g.) to a one-liter resin kettle equipped with an agitator, thermometer and Dean-Stark water trap with an Allihn reflux condenser. A means for application of vacuum was also attached. The pressure was reduced to 400 mm. Hg. and the reaction temperature maintained at about 82.5°–90° C. for about 15 hours.

Phthalic anhydride (148.0 g., 1.0 mol), ethylene glycol (34.2 g., 0.55 mol) and hydroquinone (0.018 g., 0.035 percent on reactant charge) are added to the kettle. The vacuum means is removed and an adjustable length nitrogen inlet tube is placed on the kettle. Reaction is continued under nitrogen at 115°–120° C. until the product has an acid number of 36.

A peroxide curing agent is added and the mixture coated on a panel and cured. A clear coating is obtained.

We claim:

1. An unsaturated polyester of a reaction mixture of a dihydroxy reactant containing at least about 5 percent by weight of a statistically difunctional isocyanurate alcohol of the formula:

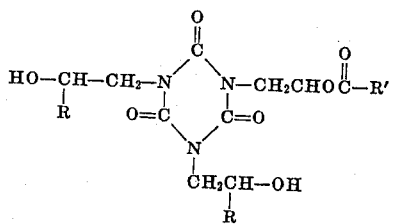

wherein R is hydrogen, methyl or ethyl and R' is the residue of a blocking acid having 1 to 12 carbon atoms and a dicarboxylic acid reactant containing a dicarboxylic acid or derivative thereof, and wherein one of said blocking acid or dicarboxylic acid contains α-ethylenic unsaturation.

2. A polyester according to claim 1 wherein R' is the residue of an alkanoic acid or an aromatic acid.

3. A polyester according to claim 1 wherein R' is the residue of an alkenoic acid.

4. A polyester according to claim 1 wherein R is hydrogen and R' is an alkanoic or aromatic acid.

5. A polyester according to claim 1 wherein R is hydrogen and R' is phenyl.

6. A polyester according to claim 1 having an acid number below 60.

7. A polyester according to claim 1 wherein the dicarboxylic acid reactant contains maleic anhydride.

8. A polyester according to claim 1 wherein the dihydroxy reactant additionally contains a modifying polyhydric polyol.

9. A polyester according to claim 1 wherein the dihydroxy reactant contains at least 20 percent up to about 95 percent by weight of a blocked isocyanurate and from about 5 percent up to about 80 percent by weight of a modifying polyhydric polyol.

10. A polyester according to claim 8 wherein the dihydroxy reactant contains from about 10 percent to about 16 percent by weight of a modifying polyhydric polyol.

11. A resin composition comprising a polyester of claim 1, a cross-linking monomer and a curing agent.

12. A composition according to claim 10 wherein the cross-linking monomer is styrene.

13. A composition according to claim 10 wherein the cross-linking monomer is diallyl phthalate.

14. A composition according to claim 10 wherein the cross-linking monomer is methyl methacrylate.

15. A cured resin of the composition of claim 10.

* * * * *